United States Patent [19]

Kerimis et al.

[11] Patent Number: 4,499,253

[45] Date of Patent: Feb. 12, 1985

[54] PROCESS FOR THE PREPARATION OF POLYISOCYANATES CONTAINING ISOCYANURATE GROUPS AND THEIR USE FOR THE PREPARATION OF ISOCYANATE-POLYADDITION PRODUCTS

[75] Inventors: Dimitrios Kerimis, Cologne; Hanns P. Müller, Odenthal; Kuno Wagner, Leverkusen, all of Fed. Rep. of Germany

[73] Assignee: Bayer Aktiengesellschaft, Leverkusen, Fed. Rep. of Germany

[21] Appl. No.: 514,765

[22] Filed: Jul. 18, 1983

[30] Foreign Application Priority Data

Jul. 23, 1982 [DE] Fed. Rep. of Germany ....... 3227489

[51] Int. Cl.³ .............................................. C08G 18/18
[52] U.S. Cl. ...................... 528/45; 521/107; 521/108; 528/51; 544/193
[58] Field of Search ................... 544/193; 528/45, 51; 521/107, 108, 902

[56] References Cited

U.S. PATENT DOCUMENTS

| 3,394,111 | 7/1968 | Liebsch | 260/77.5 |
| 3,919,218 | 11/1975 | Schmitt et al. | 260/248 NS |
| 4,040,992 | 8/1977 | Bechara et al. | 544/193 |
| 4,115,373 | 9/1978 | Henes et al. | 528/48 |
| 4,225,569 | 9/1980 | Matsui et al. | 423/445 |
| 4,252,923 | 2/1981 | Konig et al. | 525/452 |
| 4,255,569 | 3/1981 | Müller et al. | 544/193 |

FOREIGN PATENT DOCUMENTS 1112243 11/1981 Canada .

OTHER PUBLICATIONS

J. H. Saunders and K. C. Frisch, Polyurethanes Chemistry and Technology, pp. 94 et seq., (1962).
A. Farkas and G. A. Mills, Advances in Catalyses, vol. 13, 393, (1962).
J. E. Kresta, R. J. Chang, S. Kathiriya and K. C. Frisch, Makromol Chem. 180, 1081, (1979).

*Primary Examiner*—Maurice J. Welsh
*Attorney, Agent, or Firm*—Gene Harsh; Joseph C. Gil; Thomas W. Roy

[57] ABSTRACT

The present invention relates to a process for the preparation of polyisocyanates containing isocyanurate groups by the trimerization of a proportion of the isocyanate groups of organic polyisocyanates and termination of the trimerization reaction by the addition of a catalyst poison, characterized in that the trimerization catalysts employed are quaternary ammonium salts based on the reaction product of tertiary amines and esters of acids of phosphorus which have an alkylating action. The invention also relates to the use of the polyisocyanates with isocyanurate groups obtainable by this process, optionally in a form freed from excess starting polyisocyanates and/or optionally in a form in which the isocyanate groups are blocked with blocking agents, as isocyanate components for the preparation of isocyanate-polyaddition products, especially polyurethanes.

12 Claims, No Drawings

PROCESS FOR THE PREPARATION OF POLYISOCYANATES CONTAINING ISOCYANURATE GROUPS AND THEIR USE FOR THE PREPARATION OF ISOCYANATE-POLYADDITION PRODUCTS

BACKGROUND OF THE INVENTION

1. Field of the Invention

The present invention relates to a new process for the preparation of polyisocyanates containing isocyanurate groups by the catalytic trimerization of monomeric polyisocyanates using novel trimerization catalysts, and the use of the products obtained by the process according to the invention are isocyanate components for the preparation of isocyanate-polyaddition products.

2. Description of the Prior Art

Catalysts for the trimerization of organic isocyanates, in particular polyisocyanates, are known in large numbers (J. H. Saunders and K. C. Frisch, Polyurethanes Chemistry and Technology, page 94 et seq (1962)). Strong organic bases are suitable catalysts for trimerization, e.g. metal salts of carboxylic acids which are alkaline in reaction, metal alcoholates, metal phenolates, alkali metal carbonates, tertiary amines, tertiary phosphines and the "onium" compounds of nitrogen and phosphorus as well as heterocyclic compounds of these elements. The catalysts are frequently used as combinations or together with other compounds acting as co-catalysts, such as mono-N-substituted carbamic acid esters (A. Farkas and G. A. Mills, Advances in Catalyses, Volume 13, 393 (1962)).

In more recent processes known in the art, special organic bases are used as trimerization catalysts, some of which must be prepared by elaborate methods of synthesis.

Thus for example Mannich bases (German Offenlegungsschriften No. 2,551,634 and No. 2,641,380) or tertiary phosphines are used for the trimerization of aromatic polyisocyanates. Where phosphines are used, the uretdiones are first formed, which are converted to the isocyanate in a second reaction phase (German Offenlegungsschrift No. 1,201,992). Organic bases having a certain structure, such as quaternary ammonium hydroxides (EP-A No. 010,589 and EP-A No. 009,694), aminimides (J. E. Kresta, R. J. Chang, S. Kathiriya and K. C. Frisch, Makromol Chem. 180, 1081 (1979)) as well as aziridine derivatives in combination with tertiary amines (DE-AS No. 2,235,826) have recently been frequently used for the trimerization of (cyclo) aliphatic diisocyanates.

Completely novel trimerization catalysts have now surprisingly been found. They are distinguished by the simultaneous presence of numerous remarkable advantages:

1. The new catalysts are suitable for the trimerization of both aromatic and aliphatic polyisocyanates.
2. Most of the new catalysts as well as their reaction products with the catalyst poisons described in more detail below are soluble in the starting materials and end products of the process according to the invention described below, so that laborious methods of separation are unnecessary.
3. The trimerization reaction using the new catalysts may be carried out both solvent-free and in the presence of solvents at comparatively low temperatures so that substantially colorless, clear polyisocyanates containing isocyanurate groups are obtained as end products.
4. The slightly exothermic trimerization reaction can easily be controlled to ensure safety and progress of the process both when carried out continuously and when carried out batch-wise.
5. Only small quantities of catalysts are generally required and consequently also only small quantities of catalyst poisons, but short reaction times are nevertheless obtained.
6. The catalysts are simple and inexpensive to prepare and virtually odorless.

SUMMARY OF THE INVENTION

The present invention relates to a process for the preparation of polyisocyanates containing isocyanurate groups by the trimerization of a proportion of the isocyanate groups or organic polyisocyanates and termination of the trimerization reaction by the addition of a catalyst poison, characterized in that the trimerization catalysts employed are quaternary ammonium salts based on the reaction product of tertiary amines and esters of acids of phosphorus which have an alkylating action.

The invention also relates to the use of the polyisocyanates with isocyanurate groups obtainable by this process, optionally in a form freed from excess starting polyisocyanates and/or optionally in a form in which the isocyanate groups are blocked with blocking agents, as isocyanate components for the preparation of isocyanate-polyaddition products, especially polyurethanes.

DETAILED DESCRIPTION OF THE INVENTION

The new trimerization catalysts which are an essential feature of the invention are quaternary ammonium salts, i.e. they have no NH bonds, and constitute reaction products of (i) tertiary amines with (ii) alkylating esters of acids of phosphorus.

Catalyst component (i) may be any tertiary amine which has at least one aliphatically or cycloaliphatically bound tertiary amine nitrogen atom optionally constituting part of a non-aromatic ring system and which does not contain any isocyanate reactive groups. Amines which are particularly suitable for this purpose generally have a molecular weight of from about 59 to 250. Typical examples of such amines include trimethylamine, triethylamine, tributylamines, triethylenediamine, hexamethylene tetramine, N-methyl-morpholine, 1,5-diaza-bicyclo[3,4,0]-nonene-5 or 1,8-diazabicyclo[5,4,0]-undec-7-ene.

Catalyst component (ii) may be any neutral alkylating ester of an inorganic or organic acid of phosphorus. These include in particular alkyl esters of phosphoric, phosphorous and especially aromatic or aliphatic phosphonic acids conforming to this definition and optionally containing inert substituents. Alkyl esters of other acids of phosphorus conforming to the above definition, such as alkyl esters of phosphinic acids, phosphonous acids or phosphinous acids could also be used in principle, but are less preferred. Alkyl esters having 1–4 carbon atoms in the individual alkyl groups are preferably used. It is particularly advantageous to use phosphonic acid esters corresponding to the formula

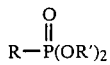

wherein

R denotes an aromatic hydrocarbon group optionally containing inert substituents, in particular a phenyl group, or an aliphatic hydrocarbon group, especially an alkyl group having 1-4 carbon atoms, and R' denotes identical or different aliphatic hydrocarbon groups, in particular alkyl groups having 1-4 carbon atoms.

Typical examples of suitable catalyst components (ii) include triethyl phosphite, diethyl phosphite, triethyl phosphate, dimethyl-benzyl phosphate, trimethyl phosphite, trimethyl phosphate, benzene phosphonic acid dimethyl ester, p-toluene phosphonic acid diethyl ester, methane phosphonic acid dimethyl ester, n-butane phosphonic acid diethyl ester, ethane phosphonic acid diethyl ester and ethane phosphonic acid dimethyl ether.

When preparing the catalysts according to the invention, the individual components (i) and (ii) are reacted together in proportions providing at least one mole of component (ii) for each gram equivalent of tertiary nitrogen of component (i). The reaction is generally carried out with any desired excess of component (ii), the excess being preferably removed after the alkylating reaction, for example by distillation. The reaction of the individual components (i) and (ii) is preferably carried out solvent-free within the temperature range of from about 50° to 200° C., preferably from about 80° to 180° C., for a period of about 0.5 to 10 hours. The reaction is generally carried out by boiling the reactants under reflux. It is frequently advantageous to carry out the reaction in an inert gas atmosphere and/or under pressure. The reaction time and temperature depend, of course, primarily on the reactivity of the individual components (i) and (ii).

The trimerization catalysts according to the invention thus obtained may, of course, be used for the preparation of any isocyanurates. This means that the catalysts are suitable not only for the process according to the invention but also, for example, for the preparation of isocyanurates by the trimerization of monoisocyanates.

For the trimerization reaction, the catalysts which are essential to this invention are used either solvent-free or as about 0.005-95% by weight, preferably about 0.01-70% by weight, solutions.

The following are examples of suitable solvents: methanol, ethanol, propanol, ethylene glycol, propanediol-(1,2), propanediol-(1,3), butylene glycol, glycerol or oligoethylene and propylene glycols (degree of oligomerization 2 to 6) (the alcohols should be capable of readily dissolving the ammonium compounds but should also still be miscible to some extent with the isocyanate and should have a low viscosity).

Aprotic solvents which are not reactive with isocyanates may also be used; their $E_T$ value (Cr. Reichardt, Lösungsmittel-Effekte inder Organischen Chemie, Chem. Taschenbücher volume 4, Verlag Chemie 196) is preferably within the range of 33.5 to 47. Apart from nitriles such as acetonitrile, propionitrile or benzonitrile, nitro compounds such as nitromethane or nitrobenzene, carbonic acid esters such as e.g. ethylene carbonate or propylene carbonate, or ketones such as acetone, acetophenone, butyl-methyl-ketone or iso-butyl-methyl-ketone, it is even possible to use such apolar solvents as chlorinated hydrocarbons, e.g. methylene chloride, chloroform, 1,1,1-trichloroethane or trichloroethylene or aromatic hydrocarbons such as benzene, toluene or xylene, or esters such as ethyl acetate, butyl acetate or ethylene glycol monomethyl ether acetate.

Although strongly polar solvents such as dimethyl formamide, N-methyl pyrrolidone, tetramethyl urea or dimethyl sulphoxide may in principle be used, they are not to be recommended, firstly because they are difficult to purify from by-products such as amines and secondly because they generally catalyze undesirable side reactions of isocyanate groups so that the resulting end products according to the invention would not be stable in storage in the presence of such solvents.

When solvents containing hydroxyl groups are used, the process according to the invention is accompanied by the formation of urethane groups due to a reaction with some of the isocyanate groups of the starting polyisocyanate. This is frequently desirable since such urethane groups have a co-catalytic effect, but is these solvents are monohydric alcohols their quantity should be limited so that the reaction mixture contains at the most about 2 mol percent of hydroxyl groups, based on the isocyanate groups in the starting polyisocyanate. It is frequently also suitable to use polyhydric alcohols such as ethylene glycol or glycerol as solvents containing hydroxyl groups for the catalysts according to the invention in order that the isocyanate functionality of the products obtained by the process according to the invention will not be diminished by urethane formation. The quantity of such polyhydric alcohols must, however, be limited so as to prevent the formation of any polyurethanes which are difficultly soluble in the end products of the process. The catalysts according to the invention for the trimerization reaction are generally used in quantities of from about 0.005 to 1.5 mol percent, preferably from about 0.01 to 0.5 mol percent, based on the quantity of starting polyisocyanate to be trimerized as well as on the ammonium salts formed from the individual components (i) and (ii), but not including any excess of alkylating esters still present. If aromatic polyisocyanates are to be trimerized without the use of solvents, the quantity of catalysts according to the invention is preferably within the range of from about 0.01 to 0.02 mol percent, whereas when the aromatic starting polyisocyanate is diluted with a suitable aprotic solvent, the quantity of catalyst is generally from about 0.01 to 0.1 mol percent.

If the starting polyisocyanates contain exclusively aliphatically bound isocyanate groups, the quantity of catalyst is generally in the range of from about 0.01 to 0.1 mol percent, whereas if the starting polyisocyanates have cycloaliphatically bound isocyanate groups the quantity of catalyst used is preferably from about 0.03 to 0.5 mol percent, all the percentages given being based on the quantity of starting polyisocyanate and of ammonium salt, as described above.

Any organic polyisocyanates may be used as starting materials for the trimerization reaction. The new catalysts according to the invention are suitable in particular for the partial trimerization of the isocyanate groups of diisocyanates within the molecular weight range of about 140 to 300 containing aromatically, aliphatically or cycloaliphatically bound isocyanate groups, e.g. tetramethylene diisocyanate, hexamethylene diisocyanate, 1-isocyanato-3,3,5-trimethyl-5-isocyanatomethyl-cyclohexane (isophorone diisocyanate, abbreviated:

IPDI), 2,4- and/or 2,6-diisocyanatotoluene, 2,4'- and/or 4,4'-diisocyanatodiphenyl methane, 2,4'-diisocyanatodicyclohexyl methane, 1-methyl-2,4-diisocyanatocyclohexane, lysine ester diisocyanates, p-xylylene diisocyanate or any mixtures of such diisocyanates. Mixtures of the aromatic diisocyanates exemplified above with the exemplified aliphatic diisocyanates in proportions by weight within the range of from about 1:3 to 3:1 are also particularly suitable. Higher functional polyisocyanates such as, for example, polyisocyanate mixtures obtainable by the phosgenation of aniline/formaldehyde condensates may also be used as starting polyisocyanates in the process according to the invention. It is also possible in principle although less advantageous to use isocyanate prepolymers as starting polyisocyanates for the process according to the invention, that is to say reaction products of excess quantities of the diisocyanates exemplified above with compounds which contain isocyanate-reactive groups and are at least difunctional. Mixtures of diisocyanates and monoisocyanates may in principle also be used as starting materials for the process according to the invention in order to obtain interesting polyisocyanates containing isocyanurate groups with a controlled reduction in isocyanate functionality. In this case, the di- and monoisocyanates are generally used in a molar ratio of diisocyanate to monoisocyanate within the range of from about 1.5:1 to 2.5:1. Examples of suitable monoisocyanates include aliphatic monoisocyanates with 1–18, preferably 4 to 8 carbon atoms, such as methyl isocyanate, n-butyl isocyanate, n-octyl isocyanate or stearyl isocyanate, and aromatic monoisocyanates, in particular phenyl isocyanate. 2,4- and/or 2,6-diisocyanatotoluene, hexamethylene diisocyanate and IPDI are preferred starting polyisocyanates for the process according to the invention.

The trimerization reaction may be carried out in the presence or absence of solvents which are inert towards isocyanate groups. The solvents used for the process according to the invention may be any solvents or solvent mixtures with a wide range of boiling points, from about 50° C./1013 mbar to 250° C./13.3 mbar, which are inert towards isocyanate groups. Low to medium boiling or high boiling solvents may be used, according to the range of application of the products of the process according to the invention. Preferred solvents are, for example, esters such as ethyl acetate, butyl acetate, ethylene glycol monomethyl ether acetate, ethylene glycol monoethyl ether acetate or ketones such as acetone, methyl ethyl ketone, methyl isobutyl ketone, cyclohexanone or methoxy hexanone. Phthalic acid esters such as, for example, dibutyl phthalate and butyl benzyl phthalate or phosphoric acid esters such as tricresyl phosphate or alkyl sulfonic acid esters of phenol and of cresol are also suitable. Solubility in diluents such as toluene, xylene or higher aromatic substances is only frequently limited since the addition of relatively large quantities of such diluents is liable to cause cloudiness and the formation of precipitates in the reaction products.

The solvent used for carrying out the trimerization and the quantity of solvent used need not be identical to the solvent or quantity of solvent present in the products of the process according to the invention when they are used according to the invention. Thus the solvent or solvent mixture used may, of course, be partly or completely removed by distillation after termination of the process according to the invention and/or partly or completely replaced by some other solvent. Products which have been prepared solvent-free may, of course, subsequently be dissolved in the above mentioned solvents.

The trimerization reaction is generally carried out within the temperature range of from about 0° to 200° C., preferably from about 10° to 100° C. and most preferably from about 25° to 80° C. When the process according to the invention is carried out in the presence of a solvent, the starting polyisocyanate which is to be trimerized and the solvent are used in quantities corresponding to proportions by weight within the range of from about 1:4 to 4:1, preferably from about 1:2 to 2:1 and most preferably from about 0.8:1.2 to 1.2:0.8.

The quantity of catalyst to be used depends, as mentioned above, upon the nature of the starting polyisocyanate and, of course, also on the reaction temperature at which the trimerization is to be carried out. It can be reliably determined by a simple preliminary experiment. The concentration of catalyst should generally be from about 5 to 15 times greater when solvents are used than in the solvent-free process.

The trimerization reaction may, for example, be carried out according to the following variations:

1. The catalyst or its solution in a suitable solvent is added at room temperature to the polyisocyanate to be trimerized without the addition of any auxiliary solvent for the trimerization reaction. The slightly exothermic trimerization reaction then generally starts up spontaneously. The reaction temperature is subsequently kept at the desired level, optionally by external cooling or heating, until the trimerization reaction is stopped by the addition of a catalyst poison.

2. The polyisocyanate to be trimerized is introduced into the reactor in the form of a solution in a solvent of the type exemplified above. The trimerization catalyst or its solution is then added to this solution. In this variation of the process according to the invention, the temperature of the reaction mixture may also be adjusted within the above mentioned ranges by external cooling or heating. Here again, the trimerization reaction is stopped by the addition of a catalyst poison when the desired degree of trimerization has been reached.

In the variations exemplified above, the trimerization reaction is generally stopped when a degree of trimerization of about 10 to 70% has been reached (degree of trimerization = percentage of trimerized isocyanate groups, based on the total quantity of isocyanate groups present in the starting polyisocyanate). When the process according to the invention is carried out solvent-free and followed by removal of excess starting polyisocyanate, for example in a thin layer evaporator, the degree of trimerization is generally in the region of about 10 to 40%. When the process according to the invention is carried out in the presence of solvents without subsequent removal of unreacted starting polyisocyanate, the degree of trimerization is generally from about 50 to 70%.

Examples of suitable catalyst poisons include all acid halides, in particular acid chlorides, e.g. acetyl chloride, benzoyl chloride, terephthaloyl diol, phthaloyl dichloride, trichloro acetyl chloride, phosphorus trichloride and phosphorus tribromide and they also include, although these are less preferred, strong acids which neutralize and hence inactivate the catalyst, such as, for example, sulphuric acid, phosphoric acid, hydrochloric acid, toluene sulphonic acid, methane sulphonic acid, chloro sulphonic acid or nona-fluorobutane sulphonic acid. To inactivate the catalyst, it is sufficient to add from about 100 to 110 equivalents percent of catalyst poison to the reaction mixture, i.e. from about 100 to 110 mol percent in the case of monofunctional catalyst poisons, based on the number of quaternary ammonium groups present in the catalyst.

The products obtained by the process according to the invention, especially if the trimerization reaction is carried out solvent-free, may be freed from excess unreacted starting polyisocyanate in known manner, for example by thin layer distillation, so that polyisocyanates containing isocyanurate groups may be obtained which contain less than about 3% by weight, preferably less than about 0.7% by weight of monomeric starting diisocyanates.

The products of the process according to the invention may, of course, be blocked in known manner with suitable blocking agents for isocyanate groups, e.g. phenol, ε-caprolactam, diethyl malonate or ethyl acetoacetate.

The products of the process according to the invention and their derivatives obtained by the above mentioned blocking reaction are valuable starting materials for the preparation of isocyanate-polyaddition products. They are suitable in particular as isocyanate especially polyurethane components for two-component polyurethane lacquers.

It is surprising that the process according to the invention can be carried out with the aid of the catalysts which are essential to this invention since it was not to be expected that the phosphorus-containing catalysts according to the invention would constitute useful trimerization catalysts in view of the fact that it was known that phosphorus compounds, in particular those which contain P=O groups (eg. phospholine oxides) were sufficient carbodiimidization catalysts. It is surprisingly found, however, that no such side reaction (carbodiimide formation) is observed when carrying out the process according to the invention. The possibility of stopping the reaction according to the invention by the addition of acid chlorides was also not foreseeable since one would have expected that quaternary ammonium salts of the type which constitute the catalysts according to the invention would be substantially inert towards acid chlorides.

In the examples which follow, all percentages are percentages by weight unless otherwise indicated.

EXAMPLES

Example 1

Preparation of an ammonium compound to be used according to the invention 101 parts by weight of triethylamine and 248 parts by weight of methane phosphonic acid dimethyl ester were mixed and lightly boiled under reflux for 8 hours with stirring. The excess methane phosphonic acid ester was then distilled off under vacuum.

140 parts by weight of a yellow, viscous liquid were obtained.

Example 2

Preparation of an ammonium compound to be used according to the invention 112 parts by weight of triethylene diamine and 1240 parts by weight of methane phosphonic acid dimethyl ester were stirred for 8 hours at 100° C. while a light stream of nitrogen was passed through. Approximately 400 parts by weight of excess methane phosphonic acid ester were then distilled off under vacuum and the precipitated product was filtered off and dried under vacuum.

355 parts by weight of a colorless, crystalline compound were obtained.

Example 3

Preparation of an ammonium compound to be used according to the invention 50.5 parts by weight of N-methyl morpholine and 124 parts by weight of methane phosphonic acid dimethyl ester were stirred for 8 hours at 100° C. while nitrogen was passed through. The excess methane phosphonic acid ester was then distilled off under vacuum.

110 parts by weight of a yellowish brown, viscous liquid which solidifies on cooling were obtained.

Example 4

100 parts by weight of 2,4-tolylene diisocyanate were dissolved in 100 parts by weight of anhydrous butyl acetate. 0.25 parts by weight of a 10% by weight solution in ethanol of the catalyst described in Example 1 were added at room temperature. The reaction mixture was stirred at 45° to 50° C. (bath temperature) for 2 hours and then at room temperature for 20 hours. The trimerization reaction was finally stopped with 0.523 parts by weight of a 3% by weight solution of benzoyl chloride in anhydrous butyl acetate and the reaction mixture was then stirred for one hour at 60° C.

A clear, colorless solution was obtained. The specifications of the solution were: NCO content 7.7% by weight; free 2,4-tolylene diisocyanate: 0.22% by weight; viscosity $\eta$ at 20° C.: 3500 mPas.

Example 5

1000 parts by weight of hexamethylene diisocyanate (HDI) were introduced in to the reactor at 40° C., and 20 parts by weight of a 3% by weight solution in ethyl hexanol of the catalyst described in Example 1 were added dropwise in the course of one hour. When all the catalyst had been added, the temperature in the reaction vessel was adjusted to about 60° C. by heating and/or cooling. After about 3.5 hours, when the isocyanate content was 39–40% by weight, the trimerization reaction was stopped by the addition of 12.5 parts by weight solution of benzoyl chloride in hexamethylene diisocyanate and stirring was then continued for one hour at 60° C. The sump product obtained, optionally after filtration and thin layer distillation, was clear and almost colorless and had the following specifications: isocyanate content: 23.2%; monomeric HDI content: 0.3%; viscosity $\eta$ at 20° C.: 3500 mPas.

Example 6

0.25 parts by weight of a 10% by weight solution in ethanol of the catalyst described in Example 2 were added to 250 parts by weight of tolylene-2,4- and -2,6-diisocyanate (mixture 65:35) and the mixture was stirred at 60° C. (bath temperature). After one hour, the reaction temperature had risen to 80°–85° C. and the isocyanate content had fallen to 35%.

Example 7

10 parts by weight of a 10% solution in ethanol of the catalyst described in Example 3 were added to 250 parts by weight of isophorone diisocyanate (IPDI) and the mixture was stirred at 80° C. (bath temperature). After 12 hours at a constant reaction temperature, the isocyanate content had fallen to 30%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of polyisocyanates containing isocyanurate groups which comprises
   (a) trimerizing a portion of the isocyanate groups of an organic polyisocyanate in the presence of a catalytic amount of a quaternary ammonium salt which is the reaction product of a tertiary amine and an alkylating ester of an acid of phosphorus and
   (b) terminating the trimerization reaction by the addition of a catalyst poison.
2. The process of claim 1 wherein
   (a) said tertiary amine has exclusively aliphatically or cycloaliphatically bound amino groups which may form part of a non-aromatic heterocyclic ring system and
   (b) said alkylating ester of an acid of phosphorus is a phosphonic acid ester corresponding to the formula:

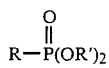

wherein
   R represents a phenyl group optionally containing inert substituents or an alkyl group having 1 to 4 carbon atoms and
   R' represents an alkyl group having 1 to 4 carbon atoms.
3. The process of claim 1 wherein said catalyst poison is an organic acid chloride.
4. The process of claim 2 wherein said catalyst poison is an organic acid chloride.
5. The process of claim 1 wherein step (a) is carried out at a temperature of from about 10° to 100° C. and the amount of catalyst is about 0.001 to 1.5 mol percent, based on the quantity of the polyisocyanate which is to be partially trimerized.
6. The process of claim 2 wherein step (a) is carried out at a temperature of from about 10° to 100° C. and the amount of catalyst is about 0.001 to 1.5 mol percent, based on the quantity of the polyisocyanate which is to be partially trimerized.
7. The process of claim 3 wherein step (a) is carried out at a temperature of from about 10° to 100° C. and the amount of catalyst is about 0.001 to 1.5 mol percent, based on the quantity of the polyisocyanate which is to be partially trimerized.
8. The process of claim 4 wherein step (a) is carried out at a temperature of from about 10° to 100° C. and the amount of catalyst is about 0.001 to 1.5 mol percent, based on the quantity of the polyisocyanate which is to be partially trimerized.
9. A process for the production of isocyanate-polyaddition products which comprises
   (a) preparing polyisocyanates containing isocyanate groups by the process of claim 1, and
   (b) reacting the product of step (a) with an isocyanate-reactive compound to form said isocyanate-polyaddition products.
10. The process of claim 9 wherein said isocyanate-polyaddition product is a polyurethane.
11. The process of claim 9 which comprises blocking the product of step (a) with a blocking agent for isocyanate groups prior to conducting step (b).
12. The process of claim 9 which comprises reducing the amount of unreacted polyisocyanate in the product of step (a) prior to conducting step (b).